United States Patent
Chu et al.

(10) Patent No.: US 7,486,684 B2
(45) Date of Patent: Feb. 3, 2009

(54) METHOD AND APPARATUS FOR ESTABLISHMENT AND MANAGEMENT OF VOICE-OVER IP VIRTUAL PRIVATE NETWORKS IN IP-BASED COMMUNICATION SYSTEMS

(75) Inventors: Thomas P. Chu, Englishtown, NJ (US); Martin Joel Glapa, Golden, CO (US); Francis Robert Magee, Lincroft, NJ (US); Steven H. Richman, Highland Park, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 976 days.

(21) Appl. No.: 10/674,885

(22) Filed: Sep. 30, 2003

(65) Prior Publication Data

US 2005/0068942 A1 Mar. 31, 2005

(51) Int. Cl.
*H04L 12/56* (2006.01)
*H04J 1/16* (2006.01)

(52) U.S. Cl. .................. 370/401; 370/352; 379/88.17

(58) Field of Classification Search ......... 370/352–356, 370/400, 401, 466, 467, 230, 389, 392; 709/231; 379/88.17
See application file for complete search history.

(56) References Cited

U.S. PATENT DOCUMENTS

| 7,369,556 | B1* | 5/2008 | Rekhter et al. ............. 370/392 |
| 2002/0150083 | A1* | 10/2002 | Fangman et al. ............. 370/352 |
| 2002/0169887 | A1* | 11/2002 | MeLampy et al. ............. 709/231 |
| 2003/0076815 | A1* | 4/2003 | Miller et al. ................ 370/352 |
| 2003/0117954 | A1* | 6/2003 | De Neve et al. ............. 370/230 |

OTHER PUBLICATIONS

Network Working Group, Request for Comments: 2685, Category: Standards Track, B. Fox, Lucent Technologies, B. Gleeson, Nortel Networks, Sep. 1999, Virtual Private Networks Identifier; http://www.ietf.org/rfc/rfc2685.txt?number=2685.

* cited by examiner

*Primary Examiner*—John Pezzlo

(57) ABSTRACT

Establishing voice calls in an IP based VPN includes determining the relative location of a terminating point with respect to an originating point of a new communication containing the voice data, determining one or more IP addresses to egress the communication from the originating point to the terminating point, creating a VPN identifier in the new communication, passing the new communication to the terminating point and removing the VPN identifier from the new communication. The VPN identifier can be an extra field added to an encapsulation coding scheme of the voice data.

16 Claims, 16 Drawing Sheets

METHOD AND APPARATUS FOR ESTABLISHMENT AND MANAGEMENT OF VOICE-OVER IP VIRTUAL PRIVATE NETWORKS IN IP-BASED COMMUNICATION SYSTEMS

FIELD OF THE INVENTION

The invention relates to the field of communications systems and more specifically to the management and control of voice-over Internet Protocol (VoIP) virtual private networks (VPNs) in an IP-based public branch exchange (PBX) environment.

DESCRIPTION OF THE BACKGROUND ART

IP based PBX has gained acceptance and momentum in the market place of advanced, high speed communications. The architecture of an prior art IP-PBX system is seen in FIG. 1. The system 100 consists of a number of IP phones (101, 102, 103) which are connected to a local area network (LAN) 120. Connected to the LAN is a server 110 which provides control of the local telephony network. The server 110 communicates with IP phones (101, 102, 103) via IP messages, accepts call requests from the IP phones (101, 102, 103) and alerts the phones upon incoming calls. There are two common standards for this protocol: H.248 from the International Telephone Union (ITU) and Session Invitation Protocol (SIP) from the Internet Engineering Task Force (IETF). The intelligence of the system 100 resides in the server 110 which can provide enhanced services such as call waiting, call hold, call transfer and the like.

In IP-PBX, voice traffic is encapsulated inside IP packets and is carried between the IP phones using the LAN. For communications to phones in the public switched telephone network (PSTN), a gateway 130 is needed to convert the IP encapsulated voice traffic to the traditional time division multiplexed (TDM) format. The gateway 130 is also under control of the server 110 using H.248. The usual access protocol between the gateway 130 and the PSTN is ISDN PRI. Many traditional PBXs have been upgraded to have an IP interface to support IP phones. These PBXs are considered as IP-PBX in this convention.

As IP-PBXs are created, the need to connect all the PBXs within an enterprise together to form a corporate network exists (just as it did with respect to TDM based systems). An advantage in connecting two IP-based PBXs is that the voice traffic is already packetized. Direct packet-to-packet connectivity is desirable as there is no need to convert the voice packets to TDM and back to again. A packet to TDM gateway is not necessary for calls between the IP-PBXs. This results in cost reduction and improvement in the performance of the system, as this avoids costly packet to TDM conversion and vice versa.

In one of the approaches to interconnect IP-PBXs, the user subscribes to connection oriented packet services, such as frame relay and ATM permanent virtual circuit services, from a service provider (SP). The SP would only provide transport services for the packet and is not aware that the packets are voice packets. In an alternate approach in which the SP can provide added functionality, the SP would actively participate in the call signaling when a call is being in set up. In doing so, the SP can provide enhanced service at the request of the end-user on a call-by-call basis. As the SP network is aware of when calls are set up and torn-down, the service can be charged based on call duration. This may result in lower cost to the end-user, another benefit. In the TDM environment, this alternative is similar to the "Software Defined Network" services from the SPs where TDM based PBXs are connected to the SP's networking using the Primary Rate Interface (PRI) from the ISDN. We will refer to this alternative as VoIP-VPN.

The module in this network that handles call signaling from the user is commonly referred to as a soft-switch. Depending on the size of the network, a network may contain a number of soft-switches, which are interconnected. Call signaling messages route through a series of soft-switches in order to establish a call as it is more efficient to connect the IP PBXs through an IP network, without converting the voice traffic to TDM and back.

In the current state of the art, all the IP phones are assigned an IP address from the SP's IP address space. However, this is a major shortcoming. Most enterprises use their own IP addressing scheme in addressing their workstations and PCs. All IP-VPN services allow the customer to use their own IP address scheme. Customer would like any VoIP-VPN service to have the same capability, i.e, the IP phones can be assigned IP address from the customer IP address space instead of the SP's public IP address space. This capability is important as, in the future, that an IP phone would actually be part of a PC or workstation. In this case, it is paramount that the PC and the IP phone use the same IP address or, at least, use IP address from the same addressing space. This invention describes an innovative method to do this.

SUMMARY OF THE INVENTION

The disadvantages heretofore associated with the prior art are overcome by a novel method for establishing and managing voice call traffic in an VoIP IP virtual private network. The method comprises, in one embodiment, determining the relative location of a terminating point with respect to an originating point of a new communication containing the voice data, determining one or more IP addresses to egress the communication from the originating point to the terminating point, creating a VPN identifier in the new communication, passing the new communication to the terminating point and removing the VPN identifier from the new communication. The VPN identifier is an extra field (such as an MPLS label) added to an encapsulation coding scheme of the voice data. In an alternate method, the packet switches (or special gateway) can perform address translation from an IP address from one IP address space to an IP address from another IP address space of the voice data.

An apparatus for IP-based VPN communications includes at least one soft-switch and at least one packet switch having an interface to said at least one soft-switch. The packet switch has a VPN processing module for selectively establishing a VPN based on a selection of originating and terminating IP addresses of voice calls passed to the at least one soft-switch and at least one packet switch. In one embodiment, the at least one soft-switch is an ingress soft-switch and an egress soft-switch. Similarly, the at least one packet switch is an ingress packet switch and an egress packet switch. The apparatus may further include a PSTN gateway connected to a gateway soft-switch and said at least one soft-switch for processing "off-net" calls. The apparatus may further include an inter-VPN gateway disposed between an ingress packet switch and an egress packet switch. The inter-VPN gateway passes packets of voice data from an originating point from one subscriber's VoIP-VPN to a terminating point of another subscriber's VoIP-VPN, modifying the VPN identifier appropriately.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The subject invention specifies a network architecture for providing a voice over IP virtual private network (VoIP VPN) service to a subscriber and a method of establishing such a VoIP VPN. The VoIP VPN service connects all the IP-PBXs of a subscriber into a single logical network. In one embodiment, the present invention provides a virtual private network service where subscribers can use their own internal dial plan. This does not preclude each IP phone from being assigned its own E.164 number (the international standard dial plan) and receiving calls from the PSTN directly. Similarly, a subscriber can use their own IP address assignment plan in assigning IP addresses to the IP-PBX server and the IP phones. The VoIP VPNs from all the subscribers share a common physical network.

Connecting IP-PBXs together to form a corporate network has many advantages to the SP and subscribers alike. The subscriber can negotiate the per-minute cost with the SP which usually results in cost saving. The subscribers can use many of the enhanced features provided by the SP. The subscriber can leave the detailed engineering and maintenance of the network to the SP. The SP offers a VoIP VPN service that allows such SP's to keep the traffic of the high-end subscribers on their network. These subscribers, in general, have a tendency to subscribe to many enhanced services, which have high margin. Another benefit to the subscriber is that the SP can charge the service based on usage (e.g. minutes of use). In many instances, the SP can provide attractive rates which results in substantial savings to the subscriber.

A useful feature of the VoIP VPN service is that the SP provides gateway functionality to the PSTN. This functionality renders the traditional packet-to-TDM gateway of the IP-PBX unnecessary. This reduces the system cost of the IP-PBX, both in capital spending and future maintenance. Also, an inter-VPN gateway would be another useful feature. The inter-VPN gateway forwards voice packets from one VPN to another directly, without conversion to TDM first. Additionally, the same architecture also applies to other voice over packet technologies such as ATM with slight modification, and not just VoIP.

Figure 1:
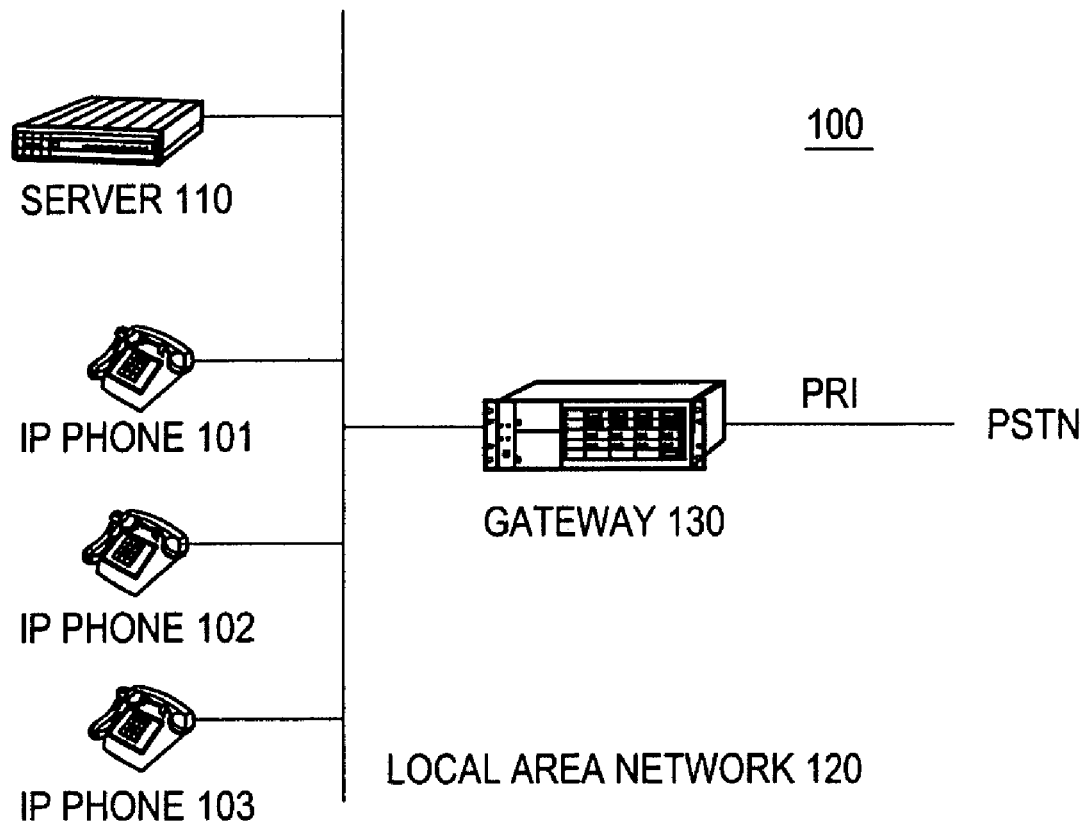
FIG. 1 depicts a general overview of a prior art IP-PBX configuration.
Figure 2:
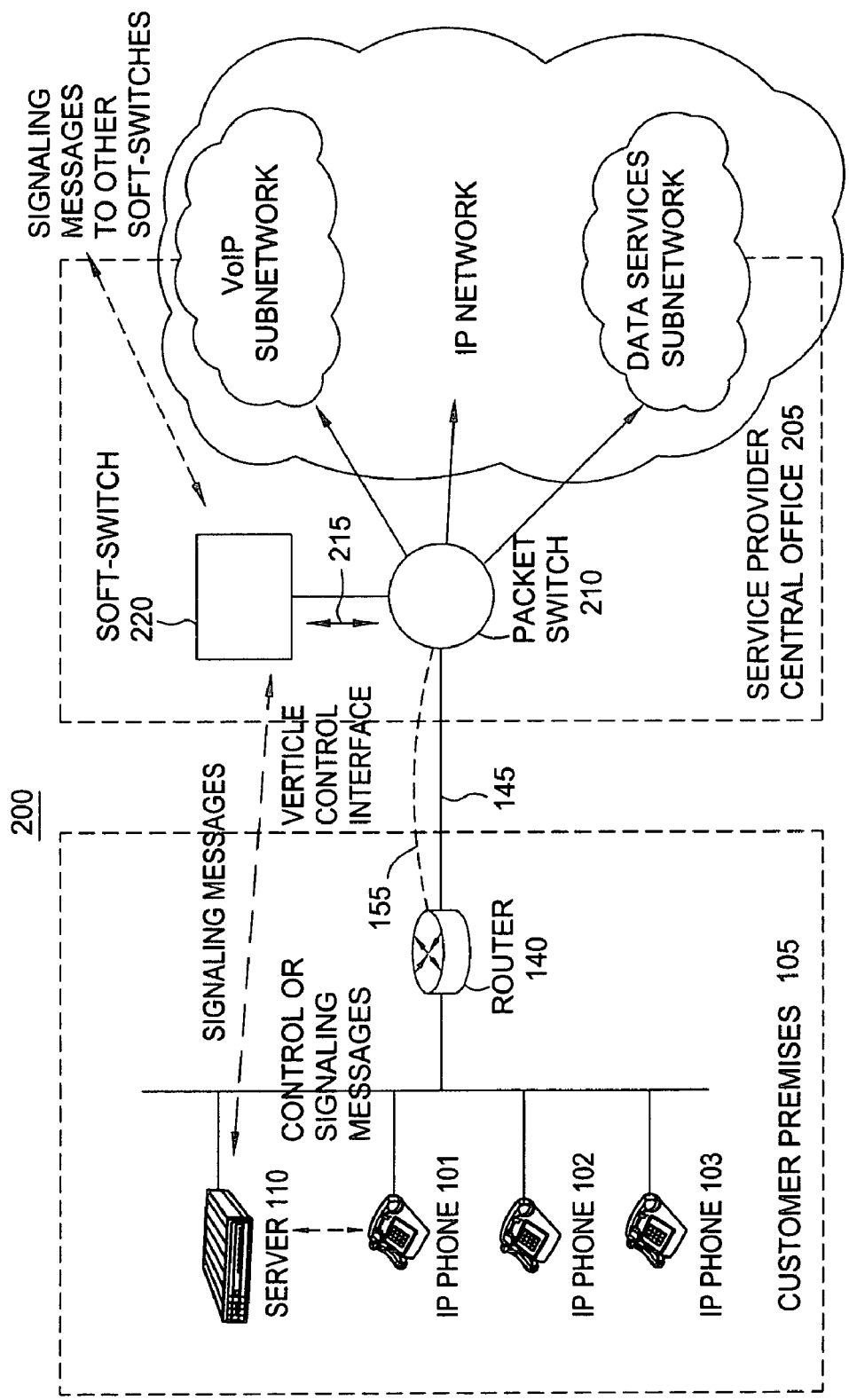
FIG. 2 depicts a general overview of a portion of a communication system in one embodiment of the subject invention.

FIG. 2 depicts a portion of an exemplary communications system 200 in one embodiment of the subject invention. The system 200 comprises a Customer Premise 105 having a plurality of IP phones (101, 102, 103) and a server 110 connected to a VoIP-VPN SP at the SP's central office 205. Connection 145 is the connection between the customer 105 and CO 205, and is made via one or more routers 140. In one embodiment of the invention, the subscriber (at the Customer Premise) uses their own IP address in assigning IP address to their devices. To increase reliability, dual access to the SP is possible (such as via a second connection 155 shown in broken line format).

The router 140 at the Customer Premise 105 is connected to a special media gateway 210 at the SP's central office. This media gateway 210 accepts voice packets from an incoming interface and switches these packets to an outgoing interface. In H.248 terminology, all the terminations of this special gateway are packet terminations, i.e. ephemeral terminations. Although the voice traffic remains in packet form, its encapsulating scheme may change (e.g. from IP to ATM, or from IP V4 to IP V6). Even if the packet encapsulation scheme remains the same, header information may be changed (e.g. one IP address to another IP address). We refer to this type of media gateway 210 as a packet switch.

Also located at the SP central office is a soft-switch 220. Server 110 at the Customer Premise 105 will communicate with the soft-switch 220 with an agreed upon signaling protocol. Examples of suitable protocols used are selected from the group consisting of H.248 and SIP. The soft-switch 220, based on requests from the server 110 or peer soft-switches (explained in greater detail below), sends the appropriate commands to packet switch 210 to set up the appropriate cross-connects. Such interaction between the soft-switch 220 and packet switch 210 is managed by a control interface (i.e., a vertical control interface) 215 (described in greater detail below). The soft-switch is the intelligence of the system. It contains all the information regarding the subscribers' VPNs. For example, it keeps track of the VPN that a location belongs to, the dial plans of the subscribers, the VPN identifier for an VPN (or a particular interface) and the like. The soft-switch can be implemented in a distributed manner in that its database may be housed in a different physical unit than its processing logic modules or as a single unit. For simplicity, in the following descriptions, the soft-switch represents the entire system, containing all the necessary modules such as signaling, control logic, service logic, database and the like.

Figure 3:
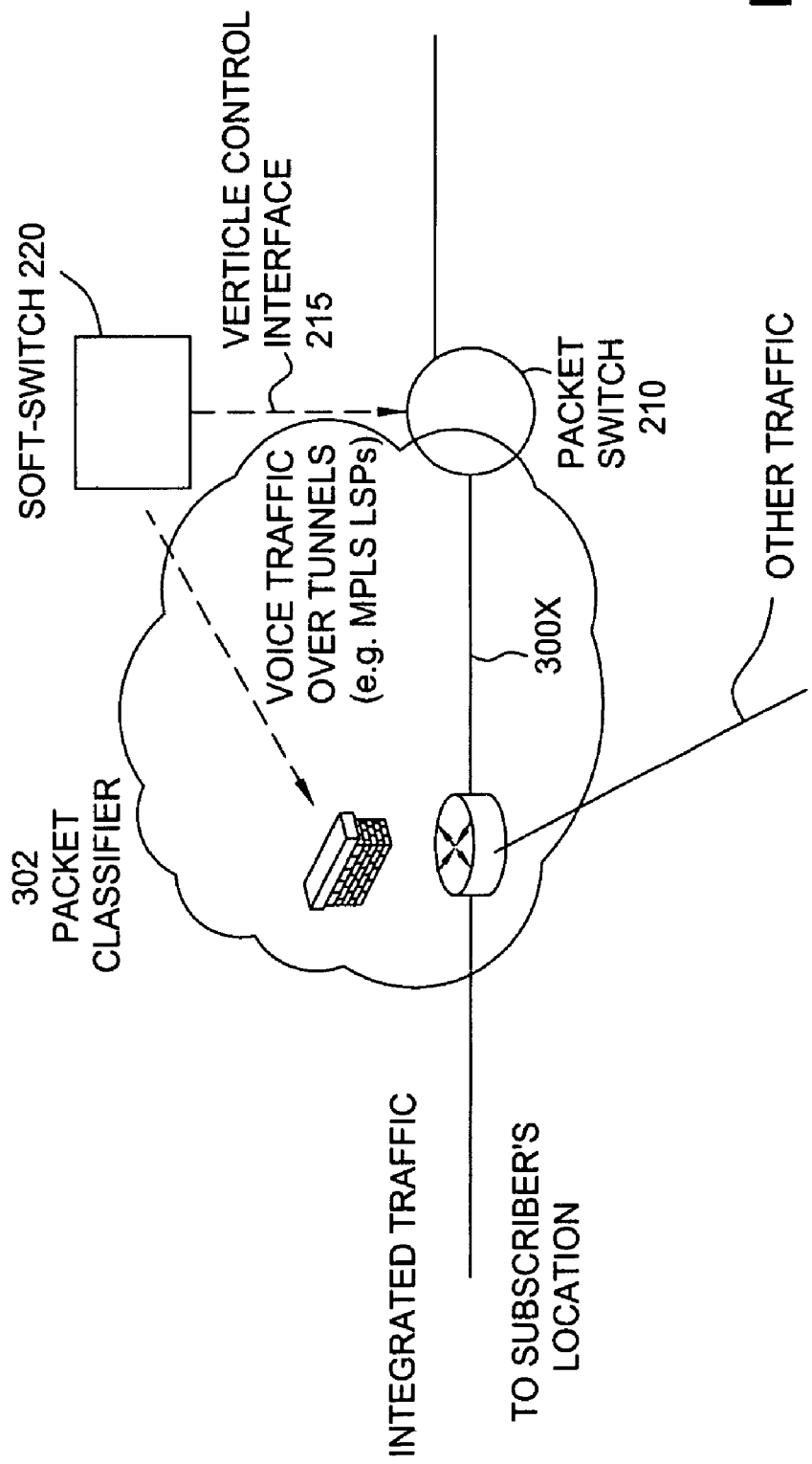
FIG. 3 depicts an abbreviated view of the system of FIG. 2 to highlight a packet classifier feature.

In general, the subscriber would subscribe to many services from the same SP, both data services as well as voice services (i.e., integrated access) via the first and second connections 145 and 155. It is the SP's responsibility to separate the packets and direct them to the appropriate network equipment that supports the individual services. The separation function that separates all packets based on some criteria is referred to as packet classification. FIG. 3 depicts an abbreviated view of the communication system 200 for the purposes of focusing on packet classification. In most cases, packet classification is performed in the packet switch 210. Both data and voice traffic is sent from the Customer Premise 105 to the packet switch 210. The packet switch 210 classifies the packets and forwards all VoIP-VPN voice packets to a VoIP network (and vice versa). The VoIP network carries both on-net (within the same VoIP VPN) and off-net (to PSTN) calls. Packet switch 210 also forwards other packets to the appropriate services.

In some implementations, a packet classifier 302 is external to the packet switch 210. One or more tunnels 300x are established between packet classifier 302 and the packet switch 210. The packet switch 302 forwards all voice traffic to the packet switch 210 through these tunnels 300x. In short, packet classification is a function of a logical module which can be external or internal to the packet switch 210.

In one embodiment of this classifier 302, each access interface has an associated table whose entries consist of destination and origination IP-address/UDP port pairs with protocol type UDP. The entries are dynamically created and deleted based on the call signaling. The table is created when a call is set up and deleted when a call is torn down. Packets matching any one of the entries will be forwarded to the logical module that handles the VoIP-VPN logic. Otherwise, packets are processed as non VoIP-VPN traffic.

As the number of the active phones rise even during busy hours, the classification table is relatively small. If memory and performance are concerns, many alternative algorithms are possible, but at the expense being more rigid. For example, all VoIP-VPN traffic can be assigned a diffServ (RFC 2474) code point (DSCP) and the classification may key on this code point. In this example, the classification table is a single entry, the DSCF. However, the subscriber has to ensure no other applications or services use this DSCF value. An alternate method is to use an IP subnet mask. This implies that all IP-phones, and only IP-phones, belong to this IP subnet.

The classification process is performed at the first point of entry to the SP's network. If the first point of entry is the soft-switch 220, information to build the classification table is already embedded in the vertical control protocol between the soft-switch 220 and the packet switch 210 and no additional protocol is needed. If the first point of entry is another device, that device needs to support the classification module and to be under soft-switch control. VoIP-VPN traffic is forwarded to the packet switch 210 via a plurality of tunnels 300x such as but not limited to MPLS LSPs. An embodiment of this control protocol is H.248 using an enhanced package that supports this function.

It is not necessary for the subscriber to classify packets at their premises. However, it may be advantageous to do so in some instances. The classifier 302 allows the same architecture as the one at the SP central office and is under the control of the IP-PBX server. After classification, the subscriber can put the VoIP-VPN traffic in tunnels (for example, a dedicated layer 2 tunnel) and transfer the packets to the SP. Certain advantages of putting the VoIP-VPN traffic on separate layer 2 tunnels include: (1) the ability to engineer the tunnels to the desired QoS level; (2) an ease in security administration as the traffic is separated and different policies can be applied to the VoIP-VPN traffic; and/or (3) diverse routing is dynamically supported on a per call basis. Calls to the same place can be forwarded differently by mapping them to different layer 2 tunnels.

Figure 4:
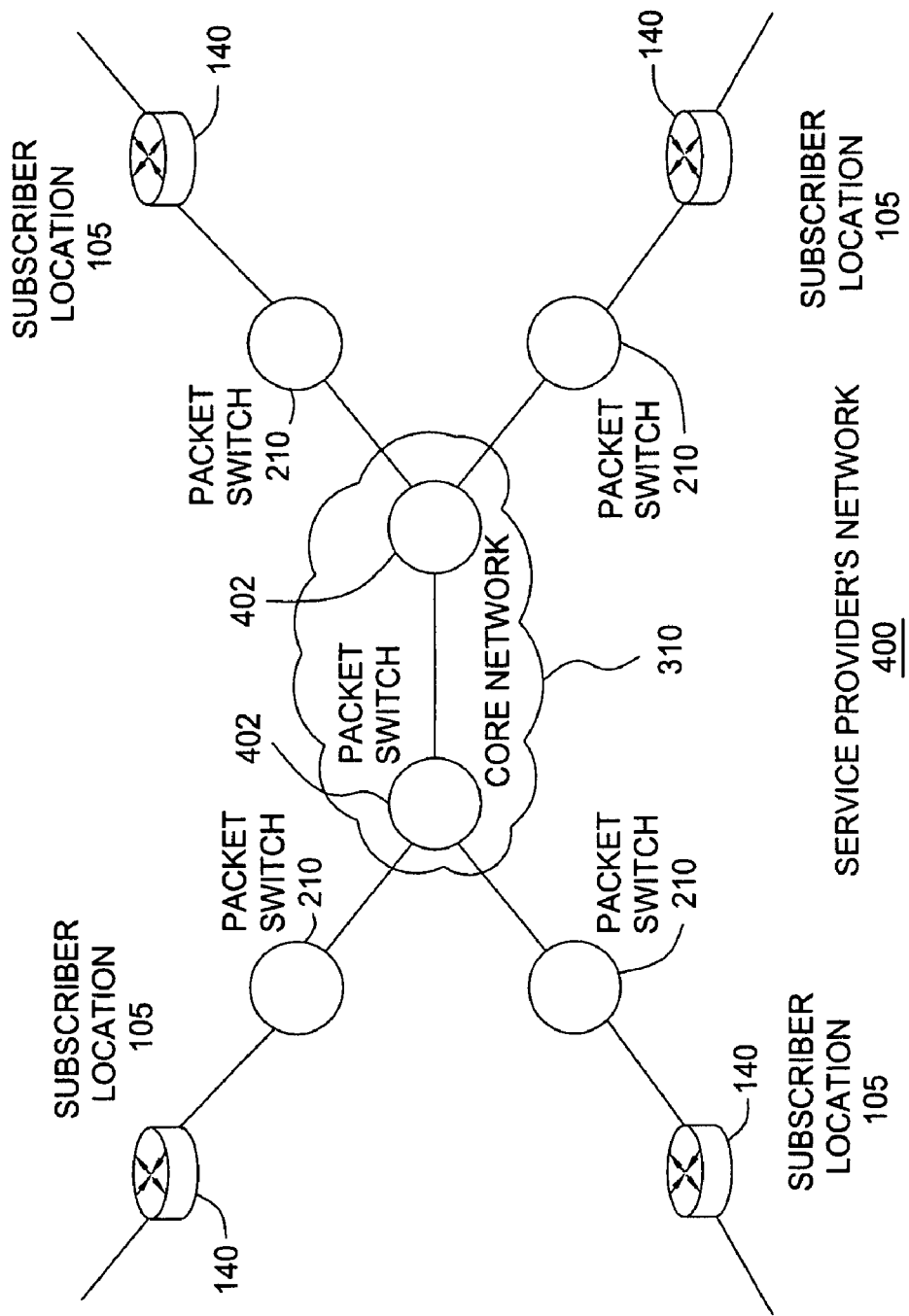
FIG. 4 depicts a general architecture of a transport network which is connected to the communication system of the subject invention.

FIG. 4 depicts the general architecture of a transport network 400 which is connected to the system 200. Packet switches 210 of various SP central offices are connected to each other through a network 310 via connection to a plurality of network core packet switches 402. In some embodiments of the invention, tunnels are used in order to provide a guaranteed level of quality of service as the tunnels can be engineered more easily. Examples of suitable tunneling techniques are frame relay permanent virtual circuit (PVC), ATM PVC, MPLS labeled switched path (LSP), IP tunnels and the like. Tunnels based on other higher layer protocols are considered layer-2 connections as these tunnels functionally provide point-to-point connectivity (layer 2 functions).

Note that the invention does not preclude direct logical connection between two "edge" packet switches 210. In fact, this is the case if the traffic volume between two packet switches warrants such a connection. More specifically, the invention supports both direct as well as consolidated (via core packet switches 402) connection. In addition, connectivity between the customer premise router 140 and the edge packet switch 210 as well as between packet switches do not necessarily need to be based on tunnel technologies. The invention also supports regular connectionless IP. However, in the latter case, quality of service may not be guaranteed.

A well accepted standard for the vertical control interface 215 between a media gateway controller (or soft-switch 220) and a media gateway (or packet switch 210) is the H.248 specification from the ITU, though others may be used. As there are many different types of media gateways, the H.248 recommendation provides the means for the industry to extend the specifications to support the different types of gateways. These extensions are referred to as "packages". The packet switch 210 can be considered as a specific type of gateway where all the terminations are ephemeral (non-permanent). This following description specifies the functional characteristics of the interface between the soft-switch 220 and the packet switch 210, and can be implemented as a package of the H.248 specification. Other embodiments of H.248 are also possible.

Figure 5:
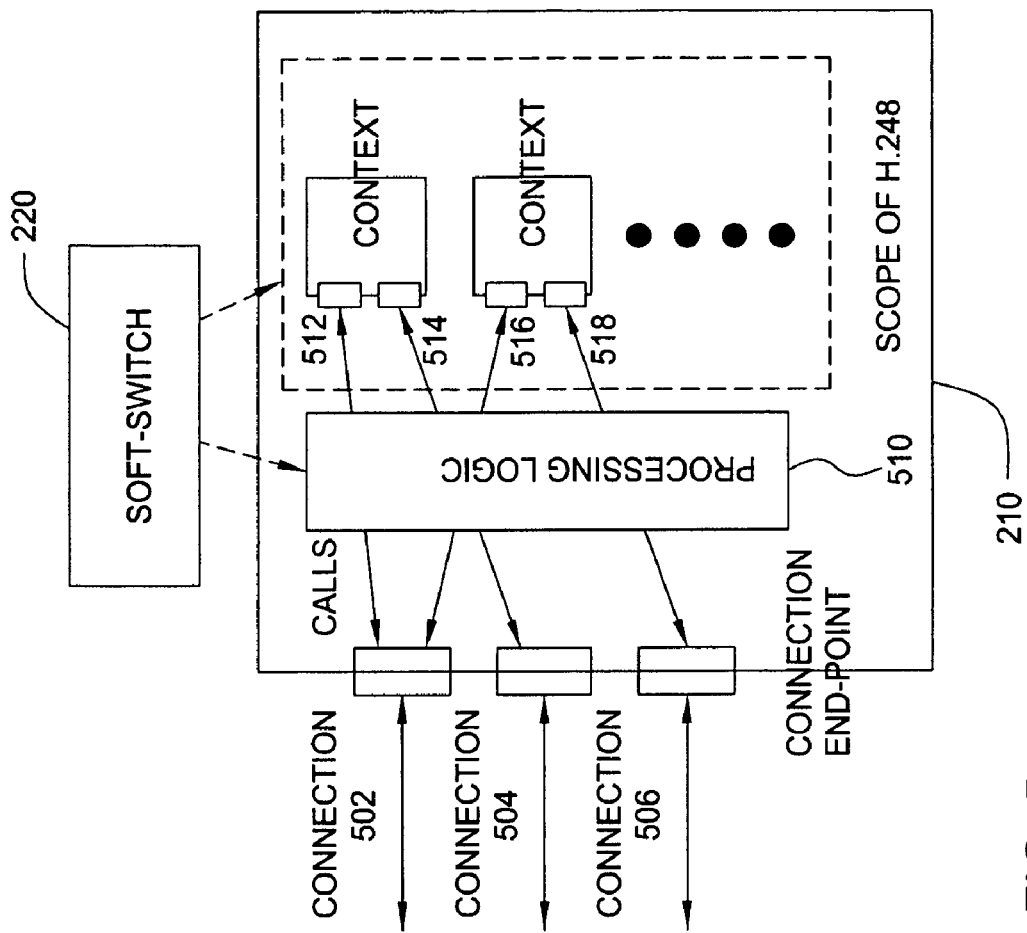
FIG. 5 depicts a detailed view of a packet switch in one embodiment of the subject invention.
Figure 6:
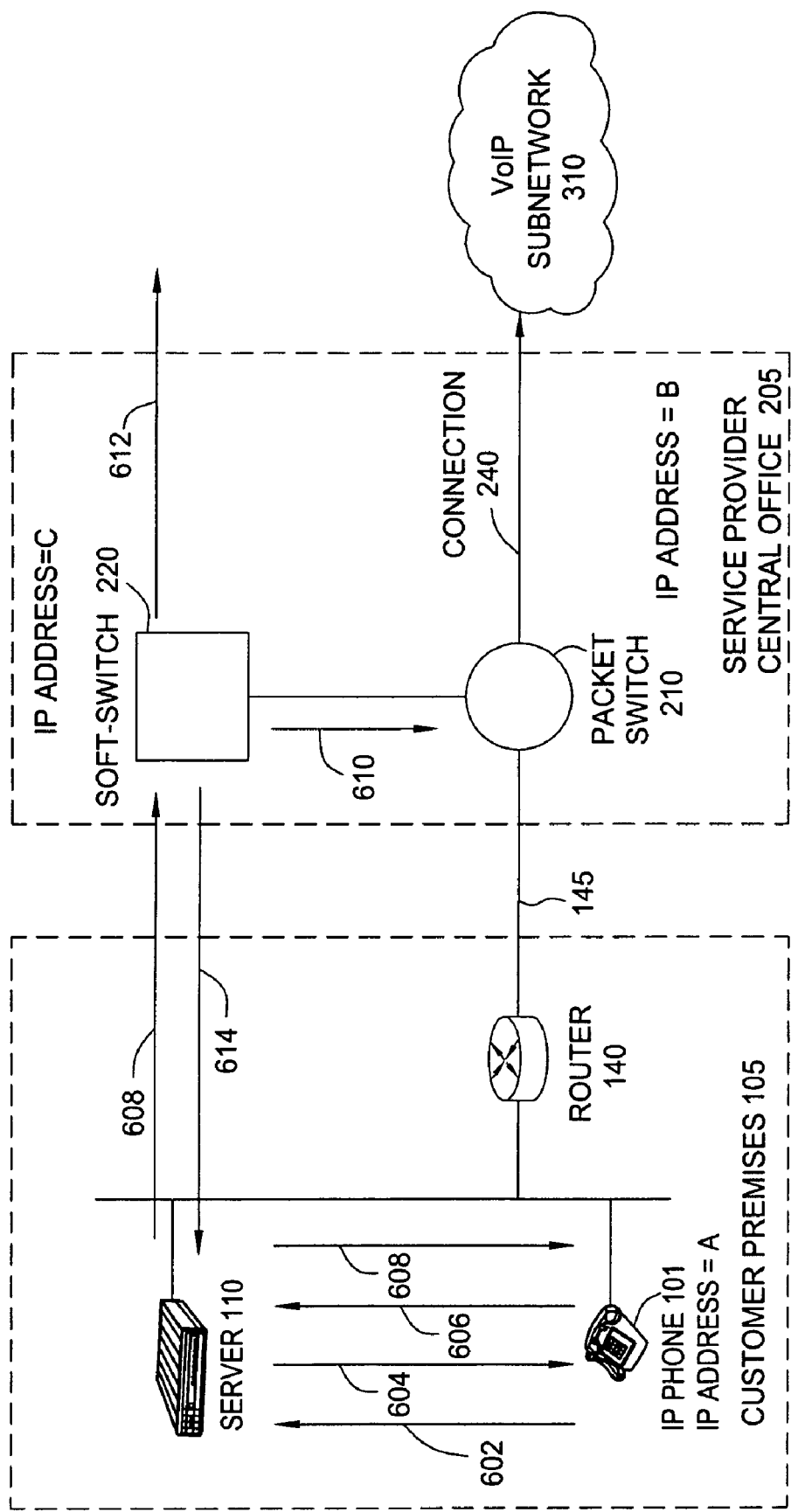
FIG. 6 depicts a flow diagram of forward signaling of a call in the ingress soft switch of the system.

The structure of the packet switch 210 is described herein for illustrative purposes only using the terminology of H.248. The logical structure of the packet switch 210 that manages voice traffic is depicted in FIG. 5. The packet switch 210 is provided with a plurality of layer-1 (physical) or layer-2 (logical link) connections 502, 504, 506. The peer of these connections can be routers 140 at customer premises 105, routers within the SF's IP network, and other packets switches (210 or 402). Each connection carries a number of voice calls. Each of the voice calls (denoted by arrows extending from the plurality of connections 502, 504 and 506 into the packet switch 210) passes through a VPN Processing Logic Module 510. The VPN Processing Logic Module 510 decides how to establish the VPN based on the originating and destination addresses in the call signaling information (discussed in greater detail below). The maximum number of allowable calls for each connection depends on the amount of network resources allocated and the nature of the calls (coder, silence suppression, etc.). The soft-switch 220 manages the number of active calls over a specific connection. Calls are identified as call terminations within packet switch 210.

When the soft-switch 220 needs to establish a cross-connect (e.g. connect a VoIP call between two connections), it sends commands to the packet switch 210 at the appropriate time to perform the following tasks: (1) create a context for the call; (2) add appropriate ephemeral terminations to the context; and (3) cross-connect the terminations within a context in the appropriate time.

The command to create context, add terminations to contexts and specifying the media flows within a context already exists in H.248. However, a new package is necessary to specify the naming convention for terminations. For the packet switch 210, a termination can be specified by two parameters, Connection End Point and Call Terminations. The Connection End-Point parameter identifies the connection that the packets come from (or exit to) via the plurality of connections 502, 504, 506. The parameter has three fields: a Layer 1 identifier, a Layer 2 identifier and a Mode. The Layer 1 identifier identifies the physical interface of the connection. Its structure may depend on the implementation of the packet switch (e.g., slot number and port number). For simplicity, the interface_number of the Interface SNMP MIB can be used to identify the interface. This assumes the existence of the Interface_MIB. Layer 2 identifier(s) identify layer 2 of the connections, both the "type" and the corresponding "identification (ID)" field. This field will have two sub-fields. The first sub-field is the "type" sub-field whose value indicates the type of layer-2 technology used. The second sub-field is the "ID" sub-field whose semantics is determined by the value of the "type" sub-field. For example, for frame relay, each physical connection can carry a number of frame relay connections, which are identified by the data link connection identifier (DLCI). The value of the "ID" sub-field would then be the value of DLCI for that connection.

There could be multiple technologies, one encapsulating the other within layer 2. Therefore, this sub-field is actually an ordered sequence of the (type, ID) pair as described above. For example, the layer 2 could be MPLS over frame relay. In this case, the sequence is (frame relay, DLCI) and then (MPLS, label). Depending on the encoding scheme, an additional information sub-field, indicating the number of entries in the sequence may be added. In an alternate embodiment, an indicator field in each entry exists to indicate whether there are more entries following. The order of the entries indicates the order of encapsulation.

As discussed previously, connections between packet switches 210/402 and routers 140 do not necessarily have to be tunnel oriented. The connection can also be regular connectionless IP. In such case, examples of layer-2 technologies used are Point-to-Point Protocol (PPP), Ethernet, etc. The Mode parameter is used to indicate whether the connection is for send only (away from the packet switch), receive only (to the packet switch), or both.

Other parameters associated with a connection are the traffic characteristics of the connection (e.g. effective bandwidth, peak traffic rate, etc.) and the quality of service (packet loss rate, end-end-delay) etc. Both the soft-switch 220 and the packet switch 210 need to store this information. The soft-switch 220 needs this information in determining whether to admit a call over a particular connection. The packet switch 210 needs this to reserve the necessary resource (bandwidth, buffer, etc) to support the connection. In general, this information is not passed between the soft-switch 220 and the packet-switch 210 during call set up. However, the soft-switch 220 may need to set and retrieve this information for a particular connection at a packet switch 210 at less frequent intervals. In one embodiment of this invention, the setting and retrieval of this information is executed through the H.248 vertical interface.

The Call Terminations parameter identifies call termination and are identified as entities 512, 514, 516 and 518 in FIG. 5. The parameter has two sub-fields: IP address & UDP port number and VPN ID and other identifiers. With regard to IP address & UPP port number, in standard based VoIP implementation, voice traffic is encapsulated within IP/UDP/RTP packets. The packets are identified by their destination IP address, origination IP address, destination UDP port number, and origination UDP port number. With regard to VPN ID and other identifiers, in VoIP VPN, the subscriber can use their own IP addressing scheme. Therefore, an additional identifier is needed to indicate the VoIP VPN to distinguish the different IP address spaces. One embodiment of this identifier is to use the label of MPLS. The most interior MPLS label of a packet can be used to distinguish the VoIP VPN or even the egress interface (explained in greater detail below) at a packet switch 210, at the discretion of the SP. An alternate embodiment is to use the VPN ID as specified in RFC 2685 from the IETF. Just as the "layer-2 identifier"field in the "Connection End-Point" parameter described before, additional identifiers may also be attached to support other enhanced features, (e.g. diverse routing). Therefore, this field is a sequence of identifiers in the form of (type, ID). The order of the sequence is significant, as this determines the meaning of the entry.

The above description describes how call terminations and contexts are managed by the vertical control interface 215. The vertical control interface 215 can be extended to also manage the connections. The connections are identified by the connection end-points as described above. The soft-switch 220 can create, remove and change the characteristics of a connection end-point through the interface 215. In another embodiment, connection end-points are managed through the network management interface of the packet switch 210.

The sequence of signaling and control messages to originate an On-Net Call is illustrated in FIGS. 6-11. Specifically and with regard to FIG. 6, the sequence is shown as a series of flow arrows 602-616 about the system 200. The standard protocol between the IP phone and the IP-PBX server could be H.248, H.323, or SIP. In the following example of an on-net call, a H.248 protocol is assumed; the invention applies to other protocols as well. The protocol between the server 110 at the customer premise 105 and the soft-switch 220 at the central office 205 is assumed to be SIP. The invention optionally supports other alternatives, such as H.323. When a signaling or control message is sent from one device to another, usually the recipient of the message sends an acknowledgement to the sender. For the sake of simplicity, these background messages will not be shown in the following description.

The sequence starts at step 602 when the user picks up the handset at phone 101. The phone will send an H.248 event to server 110 indicating that the phone is off-hook. At step 604, server 110 sends a H.248 "signal" command to IP phone 101 instructing the phone 101 to generate a dial tone to the user. At the same time, the server 110 also sends another message to instruct the IP phone 101 to begin to collect dialed digits from the user. At step 606, IP phone 101 collects dialed digits from the user and sends them to server 110 through H.248 "event" messages. The digits can be sent one at a time or "en block".

At step 608, after receiving all the dialed digits from the phone 101, server 110 consults its dial plan to determine whether the call is local, to another on-net phone, or to a phone that is on the PSTN. In this example, the call is to another on-net phone in another location. The server 110 then sends an SIP "invite" message to soft-switch 220 at the central office 205. There are many ways to encode the SIP message. In one embodiment, the server encapsulates the ISDN PRI "Set-up" message as a MIME (Multi-purpose Internet Mail Extension) object in the SIP message. PRI is the standard protocol between a PBX and a class-5 switch in the TDM environment; therefore, its encoding is well known. This method has the benefit that it preserves all existing features. Another embodiment is to encapsulate QSIG messages instead of PRI messages. QSIG is an enhanced version of PRI used between TDM based PBXs. The out-going call request message from server 110 to soft-switch 220 includes the following information, whether the protocol is SIP based or not: (1) the called number; (2) whether the number plan is the private numbering plan or the public E.164 number plan; (3) the ID of the connection to used (In this example, there is a single connection 145 between the customer premise 105 and the SP 205. In some instances, there could be multiple connections between the two and the server 110 can specify the one to be used. The server 110 can also have the option to allow the soft-switch 220 to select the connection to use.); (4) the IP address of IP phone 101 and UDP port number for the backward and forward channels; and (5) other parameters required for enhanced services and features. The server 110 also at the same time sends a H.248 command to the IP phone 101 to create a H.248 context for this call. The analog input and output from the hand-set is added to this context.

At step 610, upon receipt of the SIP "invite" message from the server 110, the soft-switch 220 consults the dial plan for this subscriber. The dial plan to use can be determined from the ID of the server 110. In this example, the call is to another on-net phone in another location. From the database associated with the dial plan, soft-switch 220 determines the following: (1) the IP address of the egress packet switch; (2) the connection to use as the next hop for the bearer traffic; and (3) the IP address of the soft-switch of the next hop packet switch. Once the soft-switch 220 has determined this information, it sends H.248 commands to packet switch 210 instructing it to perform the following tasks: (1) create context 230 for this call; (2) add the call termination associated with call to the context just created (In this example, the call termination is identified by the following parameters: (1) connection end-point ID (the end-point ID associated with connection 145 at packet switch 210); (2) the IP address of the calling IP-phone (i.e., IP address A); and (3) UDP port address (as indicated in the SIP message, selected by the server 110 or the IP-phone 101, depending on implementation).

At step 612, once the soft-switch 220 confirmed the execution of the above activities, soft-switch 220 sends an SIP "invite" message to the next soft-switch (i.e. a soft switch in the network 400). This SIP message includes all the information from server 110 with the following addition: (1) the call is an on-net call for a particular VPN (i.e., VPN 5); (2) the IP address of egress packet switch (i.e, IP address D as shown in greater detail below); and (3) the backward channel of incoming call is on connection 240. At step 614, the soft-switch 220 also sends a SIP 100-response, trying the server, indicating that the call is in process of being set up.

Figure 7:
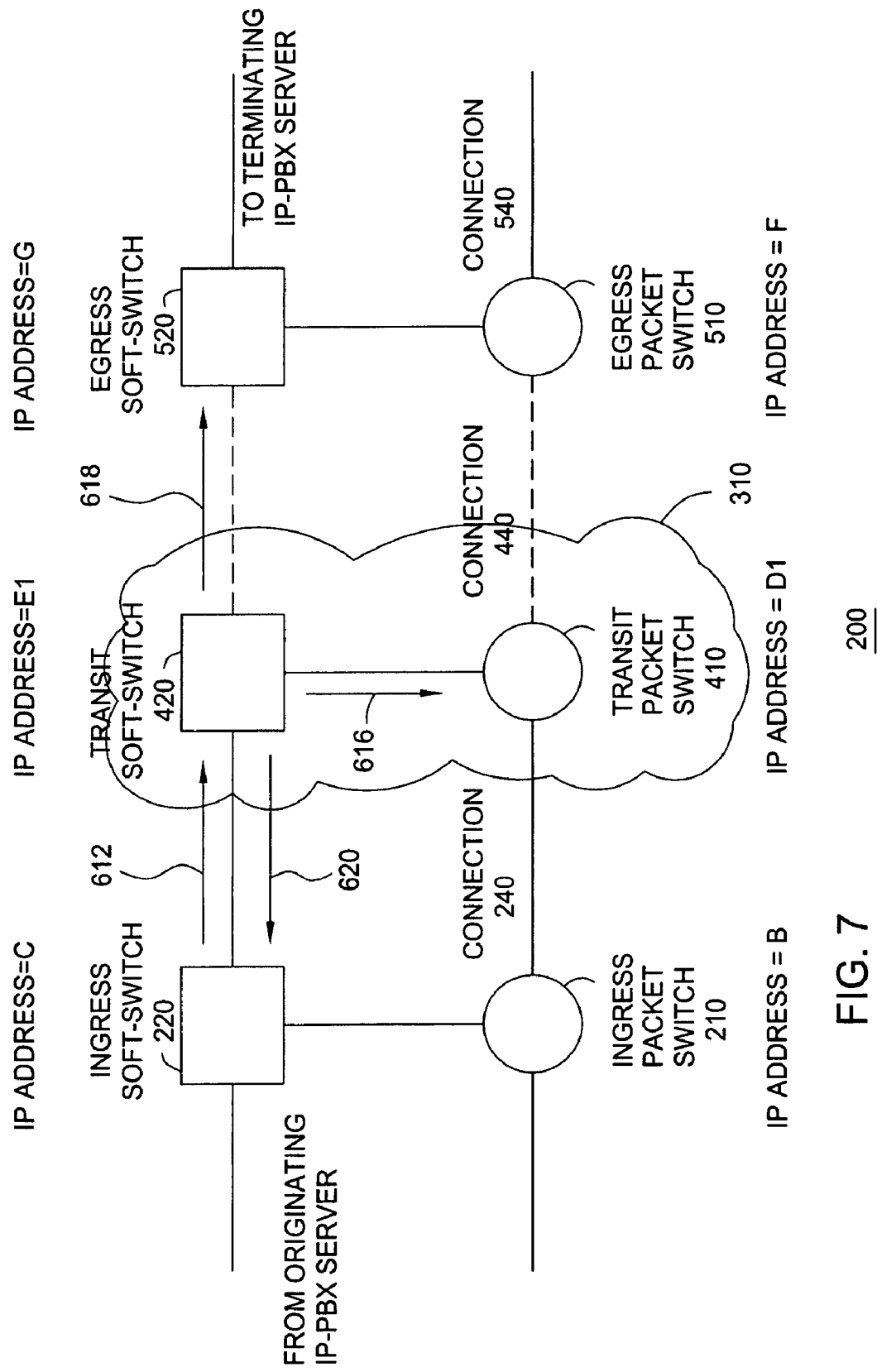
FIG. 7 depicts a flow diagram of forward signaling of a call in the transit network.

FIG. 7 depicts the sequence of signaling and control messages through the transit network 400. At this point, the soft switch 220 which manages the call from the originating server 110 is identified as an ingress soft switch, a soft switch 520 which manages the call to the terminating server 110 is identified as an egress soft switch and one or more intermediate soft switches 420 in the transit network 400 are identified as transit soft switches. Each soft switch 220, 420, 520 has a corresponding packet switch (i.e., ingress packet switch 210, transit packet switches 410 and egress packet switch 510). At step 616, upon the receipt of the SIP "invite" message from ingress soft-switch 220 from step 612, the transit soft-switch 420 determines the following from the IP address of the egress packet switch 510: (1) the connection to use as the next hop for the bearer traffic; (2) the IP address of the soft-switch of the next hop packet switch. Once the transit soft-switch 420 has determined such information, it sends a H.248 command to transit packet-switch 410 instructing the packet switch to: (1) create context for this call; (2) add the call termination associated with call to the context just created (In this example, the call termination is identified by the following parameters: (1) connection end-point ID (the end-point ID associated with connection 240 at transit packet switch 410); (2) the IP address of the calling IP-phone; (3) VPN ID (i.e., 5); and (4) the UDP port address as indicated in the SIP message in step 612).

The processing of voice packets at a transit switch is simpler than that at the ingress or egress packet switch. As the ingress packet switch 210 has already inserted the identifier that identifies either the VPN or the egress interface. The only processing is for the soft-switch to determine the forwarding interface for the traffic of this call.

At step 618, upon the completion of step 616, transit soft-switch 420 propagates the SIP message received in step 612 to the next soft-switch. The only is the connection ID for the backward channel which is changed to connection 440 in this example.

At step 620, the transit soft-switch 420 sends an SIP 100-response, "trying", to an upstream soft-switch (i.e., soft switch 220) to indicate that the call is in progress. The call may progress through a number of transit packet switches before reaching the egress packet switch. The above process is repeated at each stage. It is also possible that the ingress packet switch 210 is directly connected to the egress packet switch 510. In this case, there is no transit point. Note also, that a single soft-switch can control multiple packet-switches.

Figure 8:
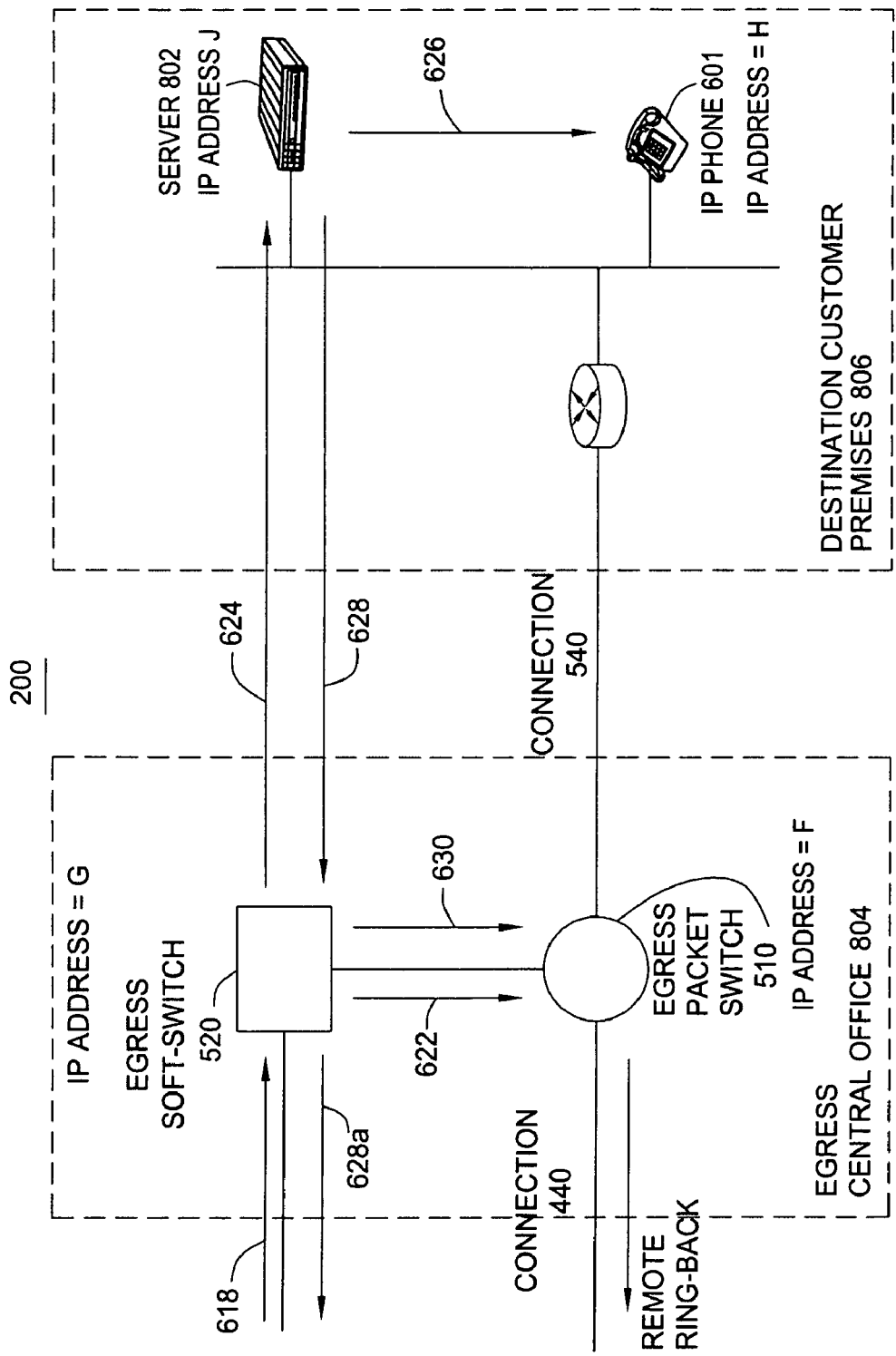
FIG. 8 depicts a flow diagram of forward signaling of a call in the egress soft switch.

The forward signaling call flow continues at the egress soft-switch 520 as detailed in FIG. 8. Specifically, at step 622, upon the receipt of the SIP message in step 618, soft-switch 520 recognizes that it is the egress soft-switch from the IP address of an egress packet. From the VPN ID field, it can determine the VPN that the call is for (i.e., VPN 5). It then consults the dialing plan for the VPN. From the called number, the soft switch 520 determines that the call is for a particular location (in this example, for a destination server 802 and over connection 540 at Destination Customer 806). It first sends H.248 commands to egress packet switch 510 to perform tasks as described in step 616. In addition, egress soft-switch 520 would instruct egress packet switch 510 to remove the VoIP-VPN identifier (or the egress interface ID) before forwarding the voice packets to a destination IP phone 601 over connection 540. Egress soft switch 520 and egress packet switch 510 form an Egress SP Central Office 804.

At step 624, egress soft-switch 520 sends a SIP "invite message" to server 802 informing the server of an incoming call. The content of this message is the same as the original SIP message sent by server 110 to the ingress soft-switch 220 in step 608.

At step 626, the server 802 determines the identity of the phone and sends a H.248 signal command to the phone to instruct it to ring.

At step 628, after the server 802 sends the command to called phone 601 to ring, it sends a SIP 100-response, "trying"

to the egress switch 510 that the call has reached the end-terminal and the user has been alerted. This message will be propagated upstream to the ingress switch as Server 110 (shown as message 628a in FIG. 8).

At step 630, the egress soft-switch 520 will send a H.248 command to egress soft-switch 510 to generate remote ring back to the calling phone 101. An alternative implementation is that the remote ring-back tone is generated by the ingress packet switch 210.

Figure 9:
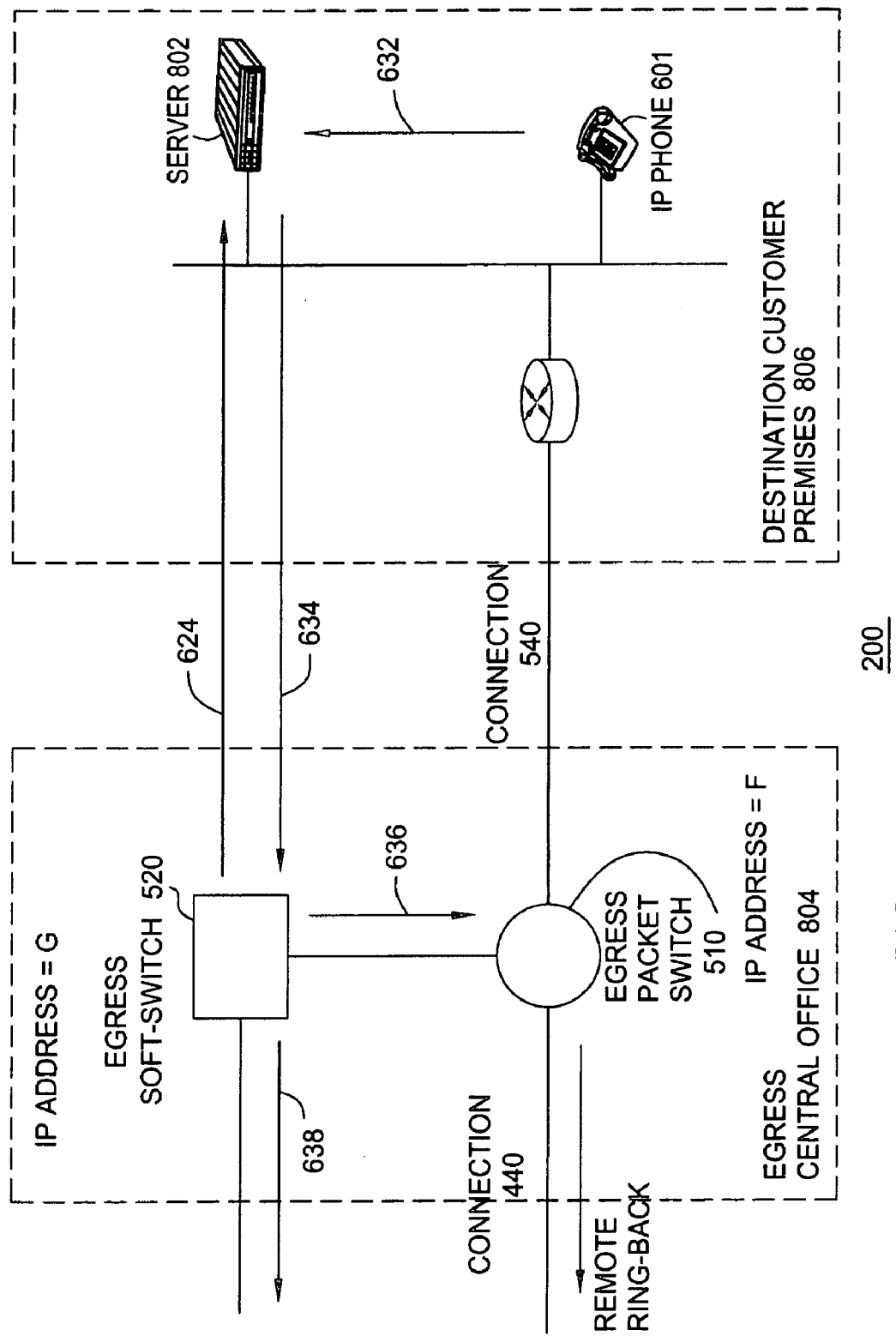
FIG. 9 depicts a flow diagram of return signaling of a call in the egress soft switch.

The sequence continues with the return signaling call flow at the egress soft-switch 520 as depicted in FIG. 9. Specifically, at step 632, when the called user picks up called (destination) phone 601, called phone 601 sends a H.248 "event" to server 802 indicating this action. At step 634, server 802 sends a SIP 200 response, "OK", to egress soft-switch 520 indicating that the user has picked up the phone. This message includes the following information: (1) the IP address of the called IP-phone 601 and the UDP port number(s) for the backward and forward channels and (2) the connection used for the forward channel (the channel from the calling phone 101 to the called phone 601). In most cases, this would be the same channel as the one used for the back channel, especially if the channel is a bi-directional channel. In any case, the backward channel and the forward channel could be different and the invention allows this.

At step 636, upon receipt of the SIP 200-response from server 610, egress soft-switch 520 first sends a H.248 command to the egress packet switch 510 to execute the following: (1) stop the remote ring-back tone; (2) add the termination associated with the called IP-phone 601 to the context that has already been created for this call and (3) cross-connect the media flows between the terminations as shown in the adjacent diagram. Basically, the transmit port of the forward channel is connected to the receive port of the forward channel and similarly for the backward channel. At step 638, the egress soft-switch 510 propagates the SIP 200-response to an upstream soft-switch (i.e., soft switch 420, 220 or the like).

Figure 10:
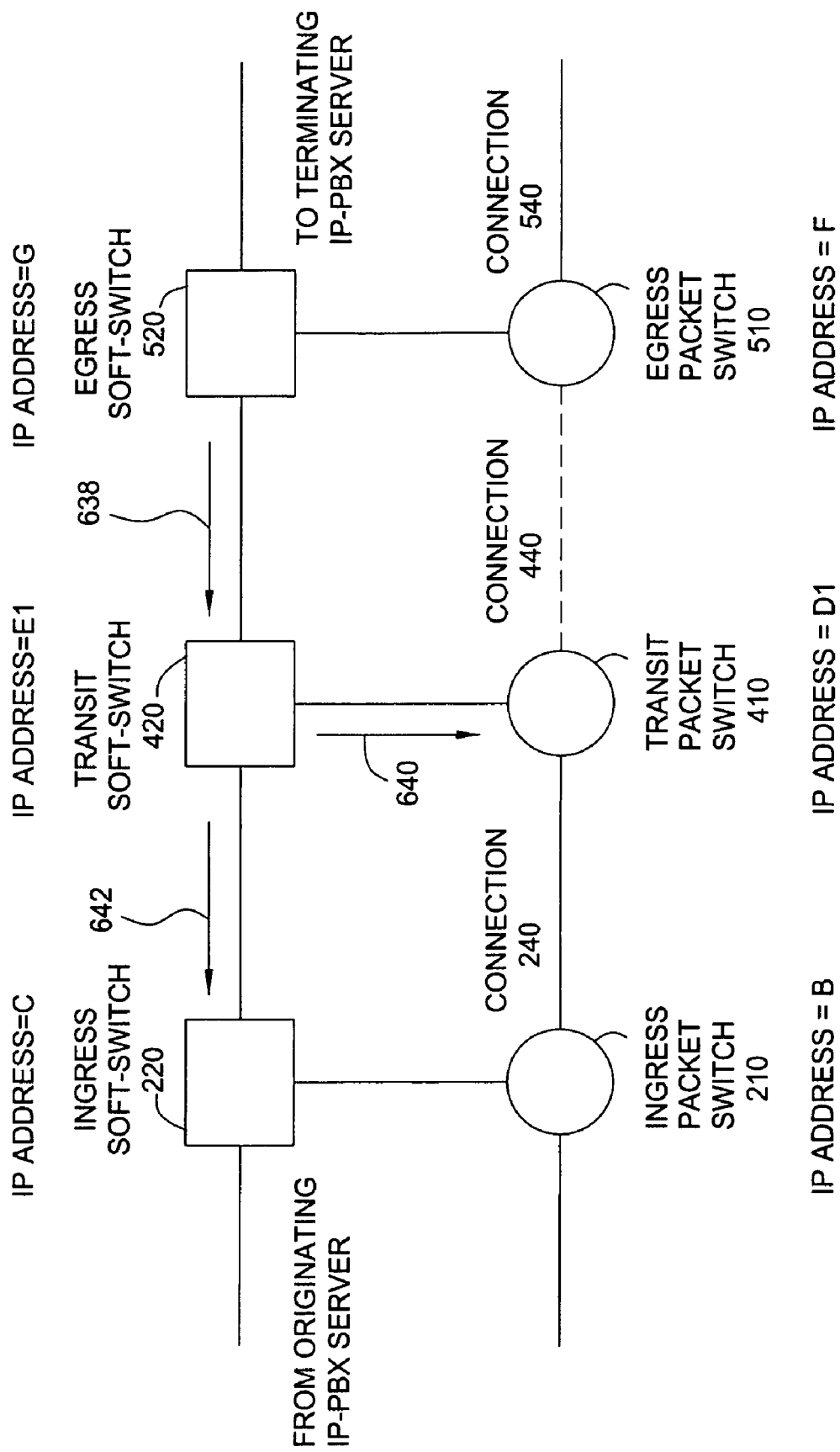
FIG. 10 depicts a flow diagram of return signaling of a call in the transit network.

Return signaling sequencing continues through the transit network 400 as depicted in FIG. 10. Specifically, at step 640, upon receipt of the SIP 200-response from the downstream soft-switch (i.e. egress soft switch 520), a transit soft-switch 420 sends H.248 command to the transit packet switch 410 to execute the tasks as described in step 636. At step 642, the transit soft-switch 420 then propagates the SIP 200 response to the next upstream soft-switch (i.e., soft-switch 220).

Figure 11:
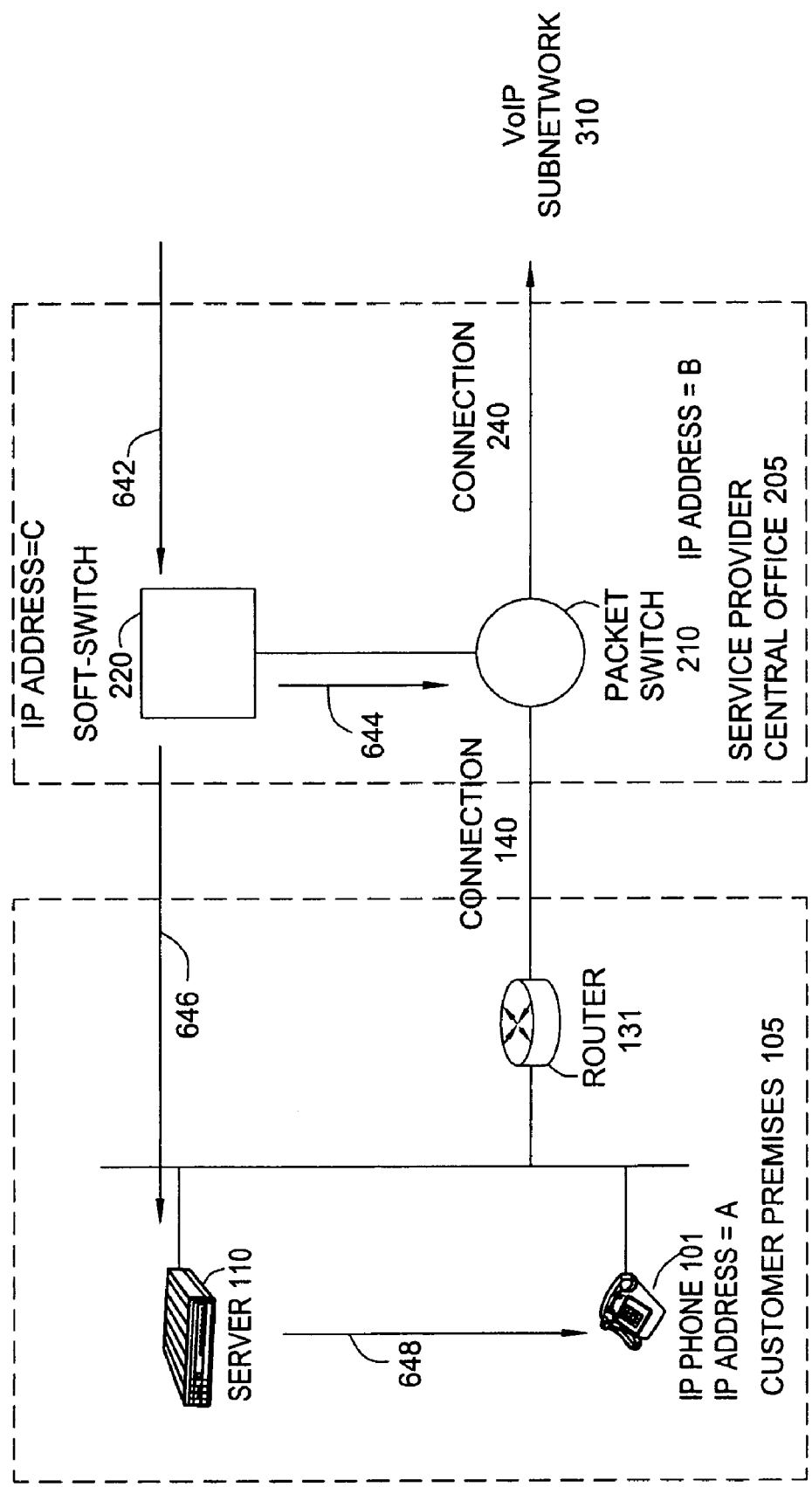
FIG. 11 depicts a flow diagram of return signaling of a call in the ingress soft switch of the system.

FIG. 11 depicts a flow diagram of return signaling of a call in the ingress soft switch of the system. Specifically, —at step 644, upon receipt of the SIP 200-response from the downstream soft-switch, ingress soft-switch 220 sends a H.248 command to the ingress packet switch 210 to execute the tasks as described in step 636. At step 646, ingress soft-switch 220 then propagates the SIP 200 response to the server 110. At step 648, the server 110 sends a H.248 command to calling phone 101 to cross connect the appropriate media within in the H.248 context. The above call is just an example. Other variations are possible. For example, the calling phone 101 could be a SIP based phone. In this case, all the H.248 commands between the server and the phone are replaced with SIP messages.

Between calling IP-phone 101 and ingress packet switch 210, voice packets are encapsulated in RTP/UDP/IP packets. For the forward channel, the source IP address is A, the IP address of calling phone 101, while the destination address is H, the IP address of the called phone IP 601. The UDP port addresses are assigned during call set up as described above. The RTP/UDP/IP packets are transmitted over lower layers as specified for connection 110.

Figure 12:
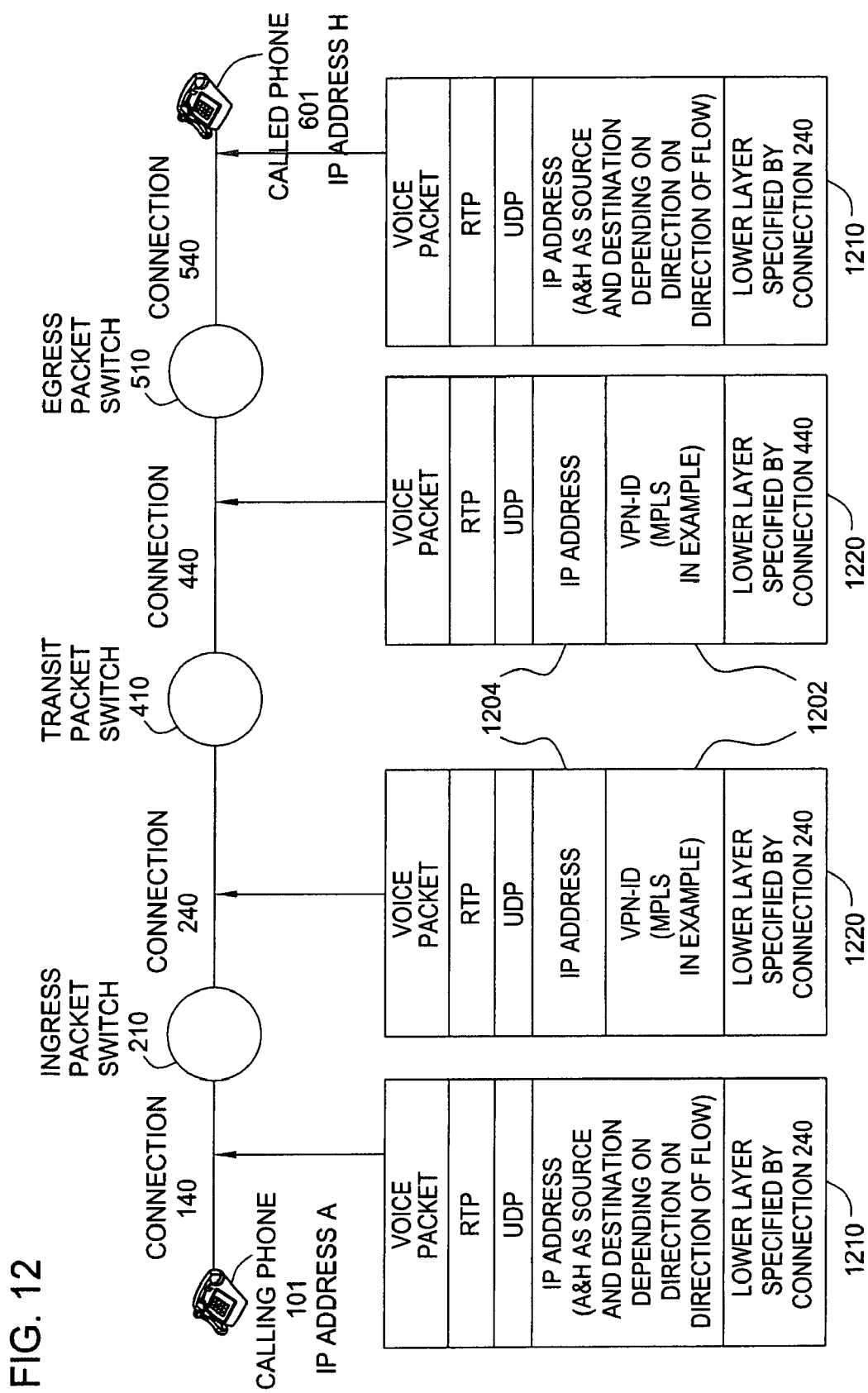
FIG. 12 depicts encapsulation schemes of voice packets in one embodiment of the subject invention.

At the ingress and egress packet switch, an identifier specifying the VPN is inserted (or removed) between the RTP/IP/UDP packet and the lower layers. In the above example, MPLS label is used as the identifier. As presented earlier, other forms of identifiers such as VPN-ID can be used. This format will be used within the SP's network. FIG. 12 is an illustration of the encapsulation scheme for the channel at various points of the network. In one embodiment, packet switch 210 is connected to multiple VoIP-VPN locations belonging to different subscribers. For example, it can be connected to location 105 of subscriber A and location 106 of subscriber B (not shown). Subscriber A and B can each use their own addressing IP plan which may overlap. As such, ingress packet switch 210 needs to distinguish these packets. In the incoming side, the packet switch can identify the packets from the access connection (i.e. all packets from connection 145 belongs to subscriber A). As the packet switch would merge and forward packets from both subscribers on connection 240, towards the core network 310, a means to identify and separate these packets is necessary. In one embodiment of the invention, an identifier 1202 is inserted below an IP layer 1204 to identify the VoIP-VPN that the packets belong to. Specifically, an existing protocol stack 1210 of the voice packet changes from voice/RTP/UDP/IP/lower-layer to an improved protocol stack 1220 voice/RTP/UDP/IP/Identifier/lower-layers. An embodiment of this identifier is MPLS label. Another embodiment is the VPN-ID as specified in RFC 2685. Incoming packets from connection 240 would also contain this identifier. Base on the value of this identifier, packet switch 210, would identify the VoIP-VPN that the packet belongs to. It will remove the identifier 1202 and forward the packet to the appropriate location, consulting a VPN-specific forwarding table if necessary.

Multiple locations from the same subscriber may be connected to the same packet switch 210. When receiving a packet from connection 140, if the identifier identifies only the VPN, the packet switch 210 needs to consult a forwarding table to determine the appropriate locations to send the packet to. This table can built dynamically using the information from the signaling messages. A simpler method is that the identifier would identify the egress interface. In this case, the packet switch would know the egress interface immediately from the identifier and no dynamic forwarding table is necessary. In this aspect, the use MPLS label is superior is they can be used to identify the egress interface as oppose to VPN-ID which only identifies the VoIP-VPN.

Similarly, there could be multiple connections from packet switch 210 to the core network 310 (connection 240). The soft-switch could instruct packet switch 210 the forwarding connection to use for a particular call, on a call by call basis. Although it is likely that a subscriber would use their own IP address plan, it is not necessary. For example small subscribers may use the SP's address plan. In this case, the additional encapsulation is not necessary.

The above description is for establishing a call between two IP phones at two locations of the same subscriber. Many subscribers, each with multiple locations, can be served by the same packet-switch/soft-switch network. Each subscriber can use their the own IP address plan as well as their own dial plan. To each subscriber, it appears that all their locations are connected by a private network, although the same network is used to serve multiple subscribers. Thus, the SP network is providing VoIP virtual private network service.

Figure 13:
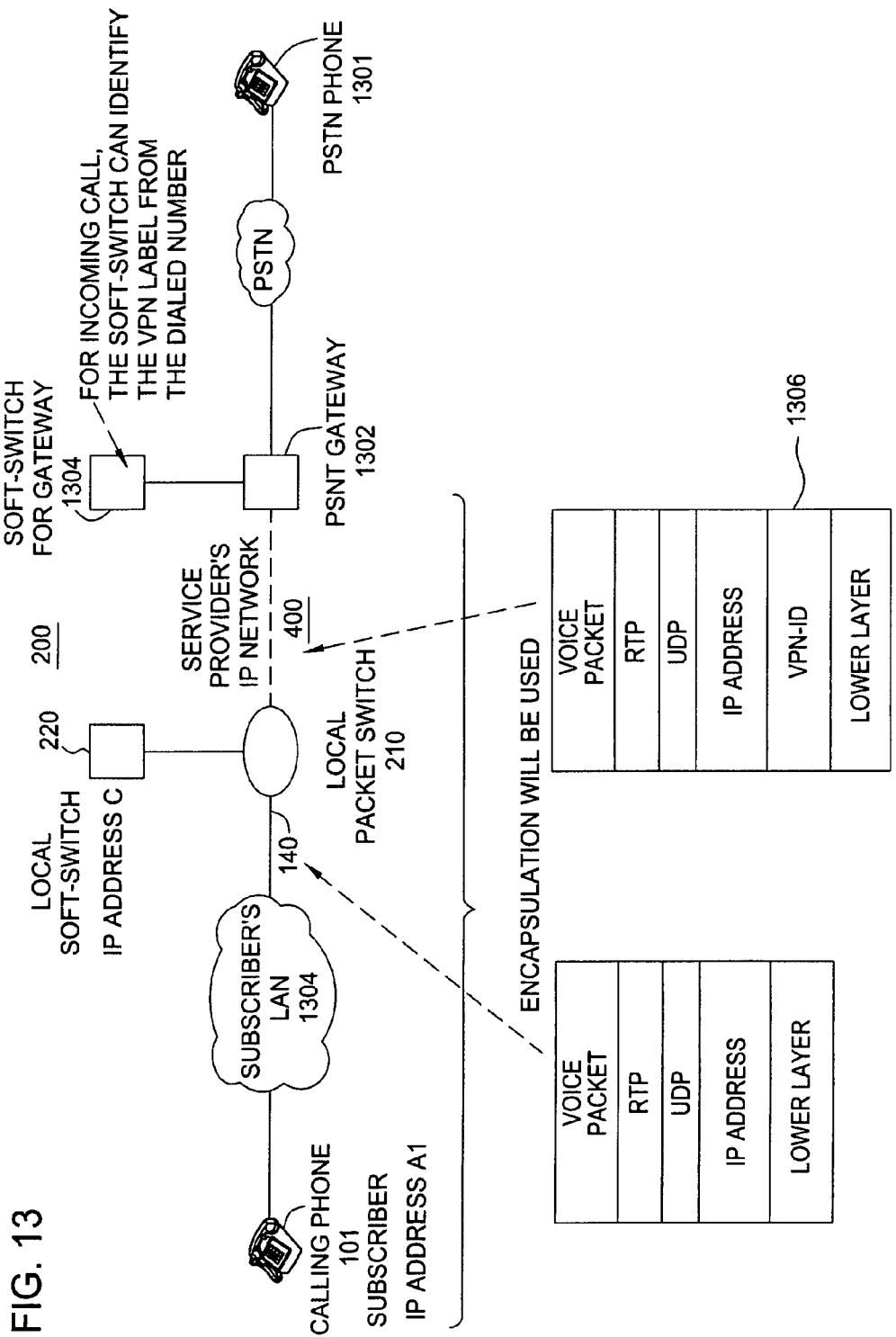
FIG. 13 depicts a configuration of a call from the VPN to the Public Switched Telephone Network in one embodiment of the subject invention.

FIG. 13 depicts the physical configuration for establishing IP-VPN service to a public switched telephone network (PSTN). For each IP-PBX, the SP will assign a block of public E.164 telephone numbers (e.g. 732-949-xxxx). For the IP addresses, the subscriber can use either its own private IP addressing scheme, the public internet addressing, or the SP's addressing plan. The subscriber manages the mapping between an IP address of an IP phone, its private telephone number, and its E.164 number. This minimizes the administrative coordination between the subscriber and the SP, thereby reducing operational expenses for both.

For connectivity to the PSTN, gateways 1302 are deployed in the network 200. For an outgoing call from an originating point phone (IP phone 101 in FIG. 13), the operation is very similar to that of an intra-net call. From the dialed digits (of a destination phone that is being called, PSTN phone 1301), ingress soft-switch 220, determines that this call is for the PSTN. From the same dialed digits, the soft-switch also determines the egress PSTN gateway 1302 and its controlling soft-switch 1304. The ingress soft-switch 220 will proceed the call signaling and control as described previously. The gateway 1302 acts as an "egress packet switch" having modifications. The modifications include: (1) call termination to the PSTN is not packet-based but TDM-based (e.g. a time slot of a DS-1 connection) and the gateway performs the packet to TDM conversion; (2) the egress soft-switch 1304 instructs the PSTN gateway which VPN identifier to use (i.e. the VPN identifier of first subscriber (phone 101) when forwarding voice packets to phone 101 and the soft-switch determines from the call origination number by consulting a database; and (3) the egress soft-switch 1304 instructs the gateway 1302 of the IP address to use in receiving voice packets from the IP-phone 101, this address is encoded in SIP messages to IP phone 101. Based on the information in these SIP messages, IP phone 101 knows the IP destination address to use in encoding its voice packet. This IP address comes from the user IP address space. The simplest implementation is for the subscriber to allocate a subnet from its IP address space for the gateway to use. However, this approach is laborious, as each gateway has to be configured correctly for each subscriber.

A simpler approach utilizes a block of IP address which is allocated for private use of a network by the IETF (i.e. they can be used by any network for their own use but packets with these address should not leak out of the network). These special reserved addresses specified in RFC 1989 and are selected from the group consisting of 10.0.0.0/8, 172.16.0.0/12, and 192.168.0.0/16. For example, in one embodiment, the PSTN gateways can use a subset of the 172.16.0.0/12 address space, say 172.16.0.0/16 as their address. Of course, each gateway would have own distinct subnet. By using this scheme, each gateway only needs to be configured to use a single set of IP addresses for all subscribers instead of a set for each subscriber. Note that the process for establishing an IP-VPN for incoming calls (i.e. into the IP network from the PSTN phone(s) 1301 is similar to the above-described process.

In the above description, at the PSTN gateway, a separate IP address is assigned from the poll to support a call. Alternately, a UDP port number can also be used to distinguish the calls. In the extreme case, the address poll at the gateway can consist of only a single IP address using UDP port number exclusively to distinguish calls. The decision to use IP address and/or UDP port to distinguish depends on the capability of the PSTN gateway and the IP-PBX.

Figure 14A:
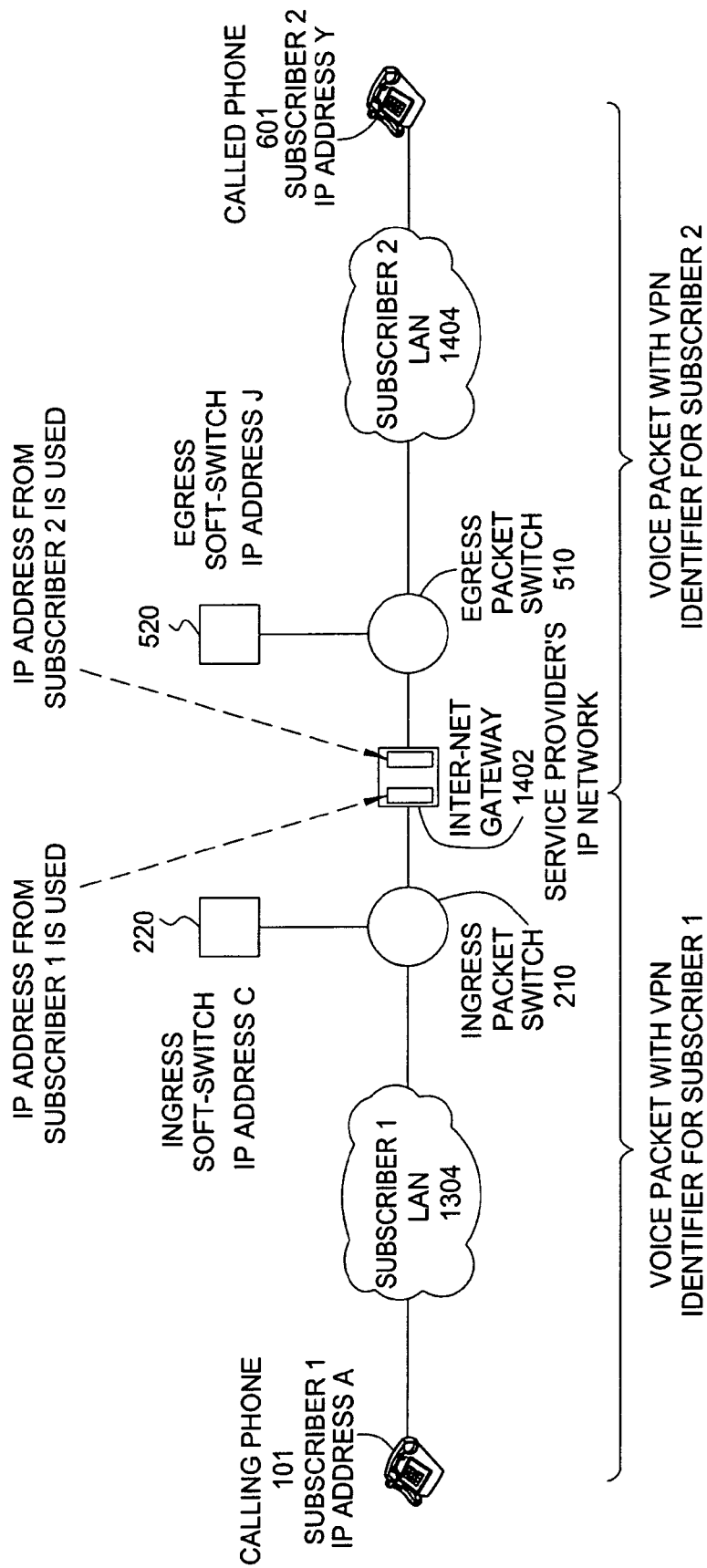
FIG. 14a depicts a configuration of a call from a first VPN to a second VPN in one embodiment of the subject invention.

The configuration shown in FIG. 14a is for calls between IP phones of different subscribers' networks (i.e. the first subscriber LAN 1304 and a second subscriber LAN 1404). In such a scenario, both phones have a public E.164 number and an Inter-VPN gateway 1402 is used to interconnect the two phones 101 and 601. The inter-network operates like two PSTN gateway connected back-to-back, with all the TDM components removed. The major differences between an inter-network packet gateway and a PSTN gateway are: (1) packets move in and out of the gateway with no TDM components or processing; (2) between the Inter-VPN packet gateway 1402 and IP phone 101, the packet gateway will use an IP address from the first subscriber's IP address space, and VPN identifier identifies subscriber 1 (or the egress interface to phone 101) and (3) there is a similar arrangement for IP phone 601 of subscriber 2. The inter-VPN will translate the IP address of phone 101 to another IP address from subscriber 2's IP address space, and the IP address of phone 601 to another IF address from subscriber 1's IP address space, when forwarding packets between the two phones. The translated IP addresses come from IP address polls allocated to the inter-VPN gateway, as described previously for the PSTN gateway.

Figure 14B:
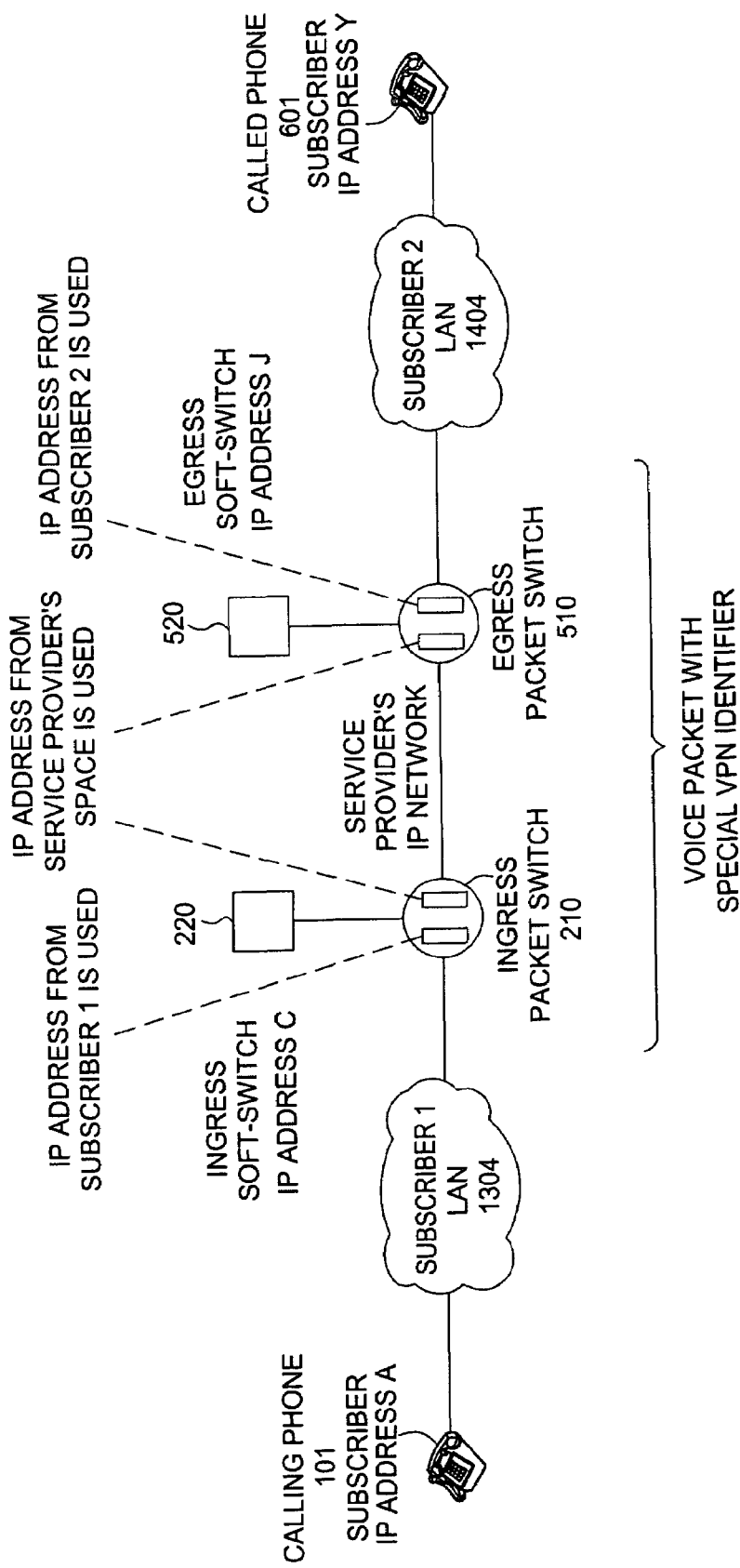
FIG. 14b depicts a configuration of a call from a first VPN to a second VPN in a second embodiment of the subject invention.

The inter-VPN packet gateway 1402 is a logical module and can be implemented in a number of ways and at different devices. One common approach is implemented together with the PSTN gateway. Another approach is to split the inter-VPN gateway module 1402 into two halves and implement each half at each packet switch. This concept is illustrated in FIG. 14b. The ingress switch packet 210 translates the IP address/port-number from subscriber 1 address space to an SP IP address/port-number and vice versa. Similarly, the egress packet switch 510 translates the IP address/port-number from subscriber 2 address space to an SP IP address/port-number. When transiting the network, a special VPN identifier (or its absence) is used. The address translation is done at a call-by-call basis, at the instruction of soft-switch.

IP Centrex Option

Centrex is a service currently offered by the local companies where the local class 5 switch is used to provide PBX like function to phones at a customer location. In VoIP, the same service is provided by absorbing the functions provided by the servers (logically) by the soft-switch at the central office. In an embodiment of this invention, the server functions as a logical module of a soft-switch. This invention integrates VoIP-VPN service with IP Centrex service in that, for a given subscriber: (1) some locations would have their own IP-PBX5 (i.e. server on-site); (2) some locations would be served by IP Centrex (i.e. server logically at CC); and (3) all locations appear to be on the same VoIP-VPN. The locations served by IP Centrex appear to the rest of the network to be served by virtual IP-PBXs dedicated to the subscriber. Of course, instead of being logical module within a soft-switch, a physical server can also be used instead.

As an enhanced feature, the SP can provide network management interfaces to a subscriber so that the subscriber can manage the virtual PBX at the central office as if the virtual PBX was dedicated to the subscriber. For example, the SP can assign a block of E.164 numbers to a virtual PBX. The subscriber can manage the IP address to E.164 number assignment himself (e.g. add, changes, delete), without constant co-ordination with the SP.

SP with Limited IP Addresses

Some SPs have limited IP addresses. Therefore, in deploying VoIP services in the their access network, this invention also applies in these situations. Basically, the access network is logically similar to a number of IP-VPN locations, each with a server and using a private IP addressing plan.

Supporting Traditional End-Points

Some locations of the subscribers may still use traditional TDM based PBXs. TDM to packet gateway can be deployed so that these TDM based PBXs appears as IP-based PBXs to the rest of the network. These gateways can be deployed at either the customer premise or the central office. Some central offices of the SP may not be equipped to support IP Centrex service. Again, TDM-to-packet gateways can be deployed in the SP Central Office to make traditional Centrex service appear as IP Centrex. (or virtual IP-PBXs).

Variations of Implementation

Figure 15:
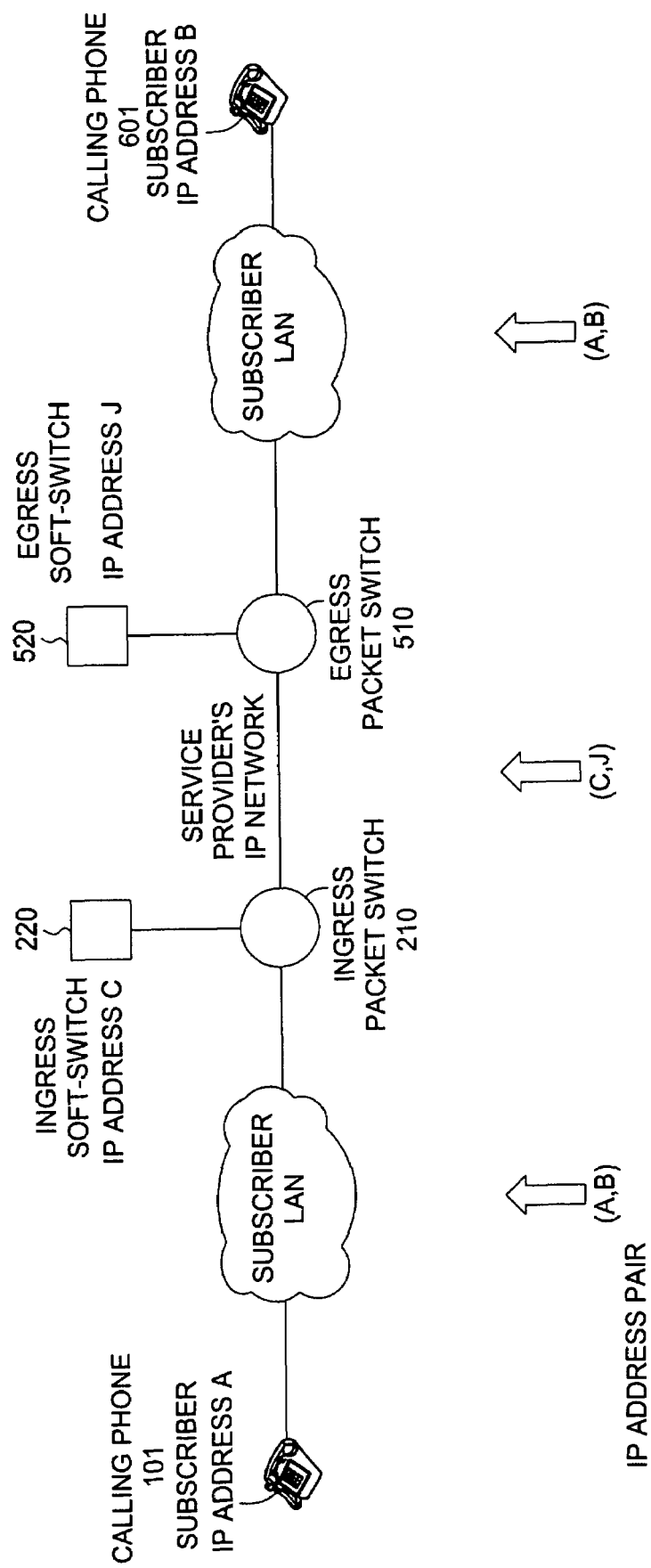
FIG. 15 depicts a configuration for a call between two locations on the same VPN where address translation is used to transfer traffic in the subject invention.

There are many variations of implementation. One example is to assign a VPN-ID to each subscriber location. This results in all calls being inter-VPN calls. Then, splitting the inter-VPN gateway module 1402 to the ingress and egress packet switch. This results in double address translation for all calls (e.g., at the ingress as well as the egress switch). This implementation is more complex and uses more network resources. However, it illustrates the flexibility and power of the invention. FIG. 15 is an illustration of this configuration and how address translation works.

FIG. 15 depicts a configuration for a call between two locations on the same subscriber where the above scheme is used to transfer traffic. In lieu of encapsulating the voice traffic using a VPN identifier, address translation by the split inter-VPN gateway at the ingress and egress packet switch is used. Referring to the figure, between IP phone A and the ingress packet switch 210, the IP address pair (destination and origination) would be A and B. Both addresses A and B are from the Subscriber's IP address space. Similarly, the address pair between IP phone B and egress packet 510 is also A and B. The ingress soft-switch 220 knows of address B through the in-bound return signaling message (step 642), while the egress soft-switch 520 learns of the address B in the out-bound forward signaling message (step 622). Over the network, the address pair (A, B) will be converted to address pair (C. J). Both C and J are from the SP's own address space. The split gateway logical module in the packet switch would execute the conversion. Signaling messages would also be extended to carry addresses C and J. The above scheme also works even if the two phones are from different subscriber's network.

Security Considerations

The subscriber may want to add additional security by authenticating and/or encrypting the voice traffic. With the subject invention, subscriber can encrypt their traffic end-to-end as traffic is transported transparently over the network. To support this capability, the signaling messages may need to convey encryption key information. The signaling link between the IP PBX server and the soft-switch can be secured by using IPSec (RFC 2401, 2402, 2406). The network can be provided enhanced additional service by providing edge-to-edge (ingress to egress) encryption and authentication.

Several embodiments of the present invention are specifically illustrated and/or described herein. However, it will be appreciated that modifications and variations of the present invention are covered by the above teachings and within the purview of the following claims without departing from the spirit and intended scope of the invention.

We claim:

1. A method for establishing an Internet Protocol (IP)-based Virtual Private Network (VPN) for a voice call between an originating point of a customer and a terminating point, the originating point associated with a first node and the terminating point associated with a second node, the method comprising the steps of:

(a) determining the relative location of the terminating point with respect to the originating point, including collecting and analyzing dialed digits of the terminating point to determine whether a PSTN gateway function or an inter-VPN gateway function processes the voice call;

(b) determining one or more IP addresses to propagate voice packets of the voice call from the originating point to the terminating point;

(c) adding, at the first node, a VPN identifier to each voice packet of the voice call;

(d) propagating the voice packets from the first node to the second node; and (e) removing, at the second node, the VPN identifier from each voice packet of the voice call;

wherein the VPN identifier identifies a VPN of the customer.

2. The method of claim 1 wherein the VPN identifier is an extra field added to an encapsulation coding scheme of the voice packets.

3. The method of claim 2 wherein the VPN identifier is an MPLS label.

4. The method of claim 1 wherein the VPN identifier is a VPN identifier as specified in IETF RFC.2685.

5. The method of claim 1 wherein an IP address of the originating point is from an IP address space of the customer.

6. The method of claim 1 wherein an IP address of the terminating point is from an IP address space of the customer or an IP address space of another customer.

7. The method of claim 1 wherein the PSTN gateway function assigns an IP address from an IP address space of the customer to represent a phone from a PSTN.

8. The method of claim 1 wherein the inter-VPN gateway function assigns an IP address from an IP address space of the terminating point to represent the originating point, when communicating with the terminating point.

9. The method of claim 1 wherein the inter-VPN gateway function assigns an IP address from an IP address space of the originating point to represent the terminating point, when communicating with the origination point.

10. The method of claim 8 wherein the inter-VPN gateway function translates the IP address of the originating point to the assigned IP address when forwarding voice data to the terminating point.

11. The method of claim 9 wherein the inter-VPN gateway function translates the IP address of the terminating point to the assigned IP address when forwarding voice data to the originating point.

12. The method of claim 1 wherein the dialed digits are a private number from a private numbering scheme of the customer.

13. The method of claim 1 wherein the dialed digits are a public telephone number.

14. An apparatus for supporting IP-based VPN communications for a voice call between an originating point of a customer and a terminating point, comprising:

a soft-switch which processes call signaling messages from endpoints of the customer, wherein said soft-switch is adapted for collecting and analyzing dialed digits of said terminating point to determine whether a PSTN gateway function or an inter-VPN gateway function processes the voice call;

a packet switch having an interface to said soft-switch, said packet switch having a VPN processing module for establishing voice calls on a selection of originating and terminating IP addresses passed to said soft-switch and said packet switch, said packet switch adapted for operating as an ingress packet switch and an egress packet switch;

wherein said packet switch adds a VPN identifier to voice packets of a voice call when said packet switch is operating as an ingress packet switch for the voice call;

wherein said packet switch removes a VPN identifier from voice packets of a voice call when said packet switch is operating as an egress packet switch for the voice call;

wherein the VPN identifier identifies a VPN of the customer.

15. The apparatus of claim 14 wherein said soft-switch is adapted for operating as an ingress soft-switch and an egress soft-switch.

16. The apparatus of claim 14 wherein said soft-switch instructs said packet switch to perform call establishing functions selected from the group consisting of:
creating call terminations and contexts;
attaching said call terminations to said context;
cross-connecting call terminations in a context;
mapping call terminations to connections.

* * * * *